(12) United States Patent
Gao et al.

(10) Patent No.: US 12,284,019 B2
(45) Date of Patent: *Apr. 22, 2025

(54) BEAM MANAGEMENT

(71) Applicant: NEC CORPORATION, Tokyo (JP)

(72) Inventors: Yukai Gao, Beijing (CN); Gang Wang, Beijing (CN)

(73) Assignee: NEC CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/203,160

(22) Filed: May 30, 2023

(65) Prior Publication Data

US 2023/0327737 A1  Oct. 12, 2023

Related U.S. Application Data

(63) Continuation of application No. 17/253,480, filed as application No. PCT/CN2018/092516 on Jun. 22, 2018, now Pat. No. 11,742,926.

(51) Int. Cl.
*H04B 7/06* (2006.01)
*H04L 5/00* (2006.01)
(Continued)

(52) U.S. Cl.
CPC ......... *H04B 7/0695* (2013.01); *H04L 5/0016* (2013.01); *H04W 56/001* (2013.01); *H04W 76/11* (2018.02)

(58) Field of Classification Search
CPC ... H04W 56/00; H04W 76/11; H04W 72/044; H04W 56/001; H04L 5/00; H04L 5/0016; H04B 7/0695
See application file for complete search history.

(56) References Cited

U.S. PATENT DOCUMENTS 10,873,406 B2    12/2020  Nagaraja et al.
11,271,699 B1 *   3/2022  Eyuboglu ............ H04B 7/0691
(Continued)

FOREIGN PATENT DOCUMENTS

CN    104811285 A    7/2015
CN    106063163 A   10/2016
(Continued)

OTHER PUBLICATIONS

Office Action issued Nov. 30, 2022 in Chinese Application No. 201880094861.7.
(Continued)

*Primary Examiner* — Hassan A Phillips
*Assistant Examiner* — Prenell P Jones
(74) *Attorney, Agent, or Firm* — Sughrue Mion, PLLC

(57) ABSTRACT

Embodiments of the present disclosure relate to methods, devices and computer readable mediums for beam management. In example embodiments, a method implemented at a first network device is provided. According to the method, a first group of resources are determined to be used by a terminal device for determining a first group of beams from the first network device. The first group of resources are different from a second group of resources configured by a second network device to the terminal device for determining a second group of beams from the second network device. The first group of resources are configured to the terminal device. A plurality of synchronization and/or reference signals are transmitted, using the first group of beams, on the first group of resources to the terminal device.

26 Claims, 8 Drawing Sheets

(51) Int. Cl.
*H04W 56/00* (2009.01)
*H04W 76/11* (2018.01)

(56) References Cited

U.S. PATENT DOCUMENTS

| | | | |
|---|---|---|---|
| 11,375,527 B1* | 6/2022 | Eyuboglu | H04B 7/15528 |
| 11,742,926 B2* | 8/2023 | Gao | H04B 7/0695 |
| | | | 370/329 |
| 2018/0020363 A1 | 1/2018 | Faxer et al. | |
| 2018/0220360 A1 | 8/2018 | Sheng et al. | |
| 2018/0262313 A1* | 9/2018 | Nam | H04L 5/0044 |
| 2018/0324678 A1 | 11/2018 | Chen et al. | |
| 2018/0368088 A1 | 12/2018 | Nagaraja et al. | |
| 2019/0037508 A1 | 1/2019 | Sun et al. | |
| 2019/0110314 A1* | 4/2019 | Abedini | H04L 5/0078 |
| 2019/0190747 A1 | 6/2019 | Park et al. | |
| 2019/0222286 A1* | 7/2019 | Miao | H04L 5/0048 |
| 2019/0239202 A1 | 8/2019 | Bhattad et al. | |
| 2019/0246340 A1 | 8/2019 | Jung et al. | |
| 2019/0253986 A1* | 8/2019 | Jeon | H04L 5/0048 |
| 2019/0254064 A1 | 8/2019 | Islam et al. | |
| 2019/0280836 A1 | 9/2019 | Bhattad et al. | |
| 2019/0281588 A1* | 9/2019 | Zhang | H04B 7/0617 |
| 2019/0306909 A1* | 10/2019 | Zhou | H04B 7/06966 |
| 2019/0349866 A1 | 11/2019 | Lin et al. | |
| 2019/0364599 A1* | 11/2019 | Islam | H04L 5/0053 |
| 2019/0387547 A1* | 12/2019 | Shin | H04W 74/0866 |
| 2020/0068462 A1 | 2/2020 | Zetterberg et al. | |
| 2020/0092846 A1 | 3/2020 | Deng et al. | |
| 2020/0154376 A1 | 5/2020 | Ko et al. | |
| 2020/0336194 A1 | 10/2020 | Karjalainen et al. | |
| 2020/0359422 A1 | 11/2020 | Xie et al. | |
| 2020/0374960 A1 | 11/2020 | Deenoo et al. | |
| 2020/0404617 A1 | 12/2020 | Murray et al. | |
| 2021/0029572 A1 | 1/2021 | Harada et al. | |
| 2021/0076241 A1* | 3/2021 | Yang | H04W 24/10 |
| 2021/0258057 A1* | 8/2021 | Kim | H04L 5/0057 |

FOREIGN PATENT DOCUMENTS

| | | |
|---|---|---|
| CN | 107615821 A | 1/2018 |
| CN | 107889130 A | 4/2018 |
| CN | 108141884 A | 6/2018 |
| JP | 2009-294263 A | 12/2009 |
| WO | 2017/022870 A1 | 2/2017 |
| WO | 2017/053756 A1 | 3/2017 |
| WO | 2018/027924 A1 | 2/2018 |
| WO | 2018/030811 A1 | 2/2018 |

OTHER PUBLICATIONS

Communication dated May 7, 2022 from the Chinese Patent Office in Chinese Application No. 201880094861.7.
Notification of Reasons for Refusal dated May 31, 2022 from the Japanese Patent Office in Japanese Application No. 2020-571517.
Samsung, "Remaining details on UE group based beam reporting", 3GPP TSG RAN WG1 Meeting #90bis, R1-1720301, 2017 (3 pages total).
InterDigital, Inc., "Remaining issues on beam management", 3GPP TSG RAN WG1 Meeting #91, R1-1720630, 2017 (13 pages total).
Huawei, et al., "Views on NR UE capabilities", 3GPP TSG RAN Meeting #79, R1-180377, Mar. 19-22, 2018, pp. 1-14.
Vivo, "Beam management and beam reporting", 3GPP TSG RAN WG1 Meeting #88bis, R1-1704488, Apr. 3-7, 2017, pp. 1-7.
ZTE, "Remaining issues on beam management", 3GPP TSG RAN WG1 Meeting #93, R1-1805828, May 21-25, 2018, pp. 1-7.
International Search Report for PCT/CN2018/092516 dated Feb. 27, 2019 [PCT/ISA/210].
Written Opinion for PCT/CN2018/092516 dated Feb. 27, 2019 [PCT/ISA/237].
JP Office Action for JP Application No. 2023-004020, mailed on Jan. 23, 2024 with English Translation.
AT & T, "Beam Measurement and Reporting", 3GPP TSG RAN WG1 #90b R1-1718388, Oct. 3, 2017.
Huawei, HiSilicon, "Discussion on Beam Measurement and Reporting for Beam Management", 3GPP TSG RAN WG4 #87 R4-1807282, May 14, 2018.
LG Electronics, "Discussion on beam measurement and reporting", 3GPP TSG RAN WG1 #90 R1-1713148, Aug. 12, 2017.
Xinwei, "Discussion on Group-based Beam Reporting", 3GPP TSG RAN WG1 #90 R1-1712267, Aug. 9, 2017.
Ericsson, "Details of SS beam reporting framework", 3GPP TSG RAN WG1 #90b R1-1718744, Oct. 3, 2017.

* cited by examiner

800 ↘

| 810-1 | 820-1 |
|---|---|
| 810-2 | 820-2 |
| ... | ... |
| 810-X1 | 820-X2 |
| 830-1 | 840-1 |
| 830-2 | 840-2 |
| ... | ... |
| 830-X1 | 840-X2 |

| 910-1 | 920-1 |
|---|---|
| 910-2 | 920-2 |
| ... | ... |
| 910-X1 | 920-X2 |
| N/A | 950 |
| 930-1 | 940-1 |
| 930-2 | 940-2 |
| ... | ... |
| 930-X1 | 940-X2 |

Fig. 9

| 1010-1 | 1020-1 |
|---|---|
| 1010-2 | 1020-2 |
| ... | ... |
| 1010-X1 | 1020-X2 |
| 1030-1 | 1040-1 |
| 1030-2 | 1040-2 |
| ... | ... |
| 1030-X1 | 1040-X2 |

Fig. 10

| 1110-1 |
|---|
| 1110-2 |
| ... |
| 1110-X |
| 1120-1 |
| 1120-2 |
| ... |
| 1120-X |

Fig. 11

BEAM MANAGEMENT

CROSS REFERENCE TO RELATED APPLICATIONS

This application is a continuation application of U.S. application Ser. No. 17/253,480 filed Dec. 17, 2020, which is a National Stage of International Application No. PCT/CN2018/092516 filed Jun. 22, 2018, the disclosures of which are incorporated herein in their entirety by reference.

TECHNICAL FIELD

Embodiments of the present disclosure generally relate to the field of telecommunication, and in particular, to methods and apparatuses for beam management.

BACKGROUND

Due to increased free space path loss in higher frequency band supported in new radio access (NR), channel/signal transmission relies on highly directional links. In other words, directional beam based communication is needed rather than the omni-directional communication in traditional communication system. Directional links, however, require fine alignment of the transmitter and receiver beams, achieved through a set of operations knowns as beam management.

In NR, beam management generally includes the following four different procedures: beam sweeping, beam measurement, beam determination and beam reporting. In beam sweeping procedure, a spatial area can be covered with a set of beams transmitted and received according to pre-specified intervals and directions. In beam measurement procedure, the quality of received reference signals may be evaluated at a network device (such as, a gNB) or at a terminal device (such as, a UE) according to pre-specified metrics (such as, Reference Signal Received Power, RSRP). In beam determination procedure, suitable beam(s) may be selected either at the network device or at the terminal device, according to the measurements obtained with the beam measurement procedure. The terminal device can use the beam reporting procedure to send beam quality and beam decision information to a Radio Access Network (RAN). There procedures are periodically repeated to update the optimal transmitter and receiver beam pair over time.

In 3GPP specifications, it has been agreed that layer 1 (L1) RSRP reporting for beam management can be based on the following reference signals: synchronization signal blocks (SSBs), Channel State Information-Reference Signals (CSI-RSs) or a combination thereof. For SSB based beam management, the current specifications only support single-TRP/panel beam reporting. However, in multi-TRP transmission, suitable beam(s) may be selected from different TRPs, while the current specifications do not support multi-TRP/panel beam reporting.

SUMMARY

In general, example embodiments of the present disclosure provide methods, devices and computer readable mediums for beam management.

In a first aspect, there is provided a method implemented at a first network device. According to the method, a first group of resources are determined to be used by a terminal device for determining a first group of beams from the first network device. The first group of resources are different from a second group of resources configured by a second network device to the terminal device for determining a second group of beams from the second network device. The first group of resources are configured to the terminal device. A plurality of synchronization and/or reference signals are transmitted, using the first group of beams, on the first group of resources to the terminal device.

In a second aspect, there is provided a method implemented at a terminal device. According to the method, in response to being configured with a first group of resources for determining a first group of beams from a first network device, a first group of RSRPs associated with the first group of beams are determined by detecting a plurality of synchronization and/or reference signals transmitted on the first group of resources. The first group of resources are different from a second group of resources configured by a second network device to the terminal device for determining a second group of beams from the second network device. A result of the determination is indicated to the first network device.

In a third aspect, there is provided a device. The device comprises a processor and a memory coupled to the processor. The memory stores instructions that when executed by the processor, cause the device to perform actions. The actions comprise: determining a first group of resources to be used by a terminal device for determining a first group of beams from a first network device; configuring the first group of resources to the terminal device; and transmitting, using the first group of beams, a plurality of synchronization and/or reference signals on the first group of resources to the terminal device, wherein the first group of resources are different from a second group of resources configured by a second network device to the terminal device for determining a second group of beams from the second network device.

In a fourth aspect, there is provided a device. The device comprises a processor and a memory coupled to the processor. The memory stores instructions that when executed by the processor, cause the device to perform actions. The actions comprise: in response to being configured with a first group of resources for determining a first group of beams from a first network device, determining a first group of RSRPs associated with the first group of beams by detecting a plurality of synchronization and/or reference signals transmitted on the first group of resources; and indicating a result of the determination to the first network device, indicating a result of the determination to the first network device.

In a fifth aspect, there is provided a computer readable medium having instructions stored thereon. The instructions, when executed on at least one processor, cause the at least one processor to carry out the method according to the first aspect of the present disclosure.

In a sixth aspect, there is provided a computer readable medium having instructions stored thereon. The instructions, when executed on at least one processor, cause the at least one processor to carry out the method according to the second aspect of the present disclosure.

In a seventh aspect, there is provided a computer program product that is tangibly stored on a computer readable storage medium. The computer program product includes instructions which, when executed on at least one processor, cause the at least one processor to carry out the method according to the first aspect or the second aspect of the present disclosure.

Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein:

FIG. 8 shows an example beam report according to some embodiments of the present disclosure;

FIG. 9 shows an example beam report according to some embodiments of the present disclosure;

FIG. 10 shows an example beam report according to some embodiments of the present disclosure;

FIG. 11 shows an example beam report according to some embodiments of the present disclosure;

Throughout the drawings, the same or similar reference numerals represent the same or similar element.

DETAILED DESCRIPTION

Figure 1:
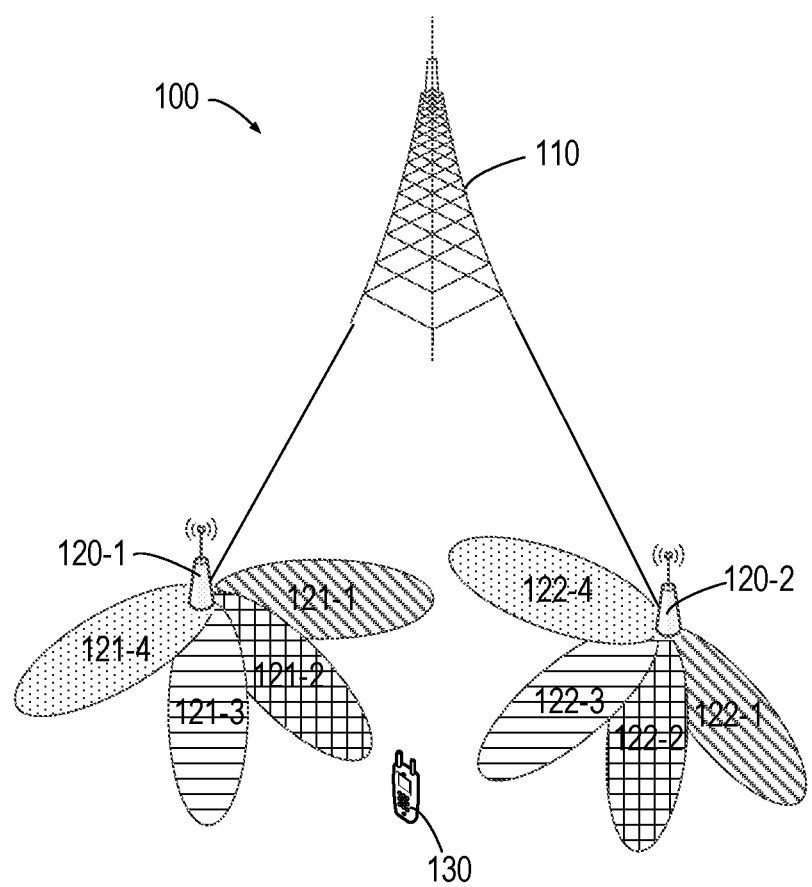
FIG. 1 shows an example communication network in which multi-TRP transmission can be supported.

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the singular forms "a", "an" and "the" are intended to include the plural forms as well, unless the context clearly indicates otherwise. The term "includes" and its variants are to be read as open terms that mean "includes, but is not limited to." The term "based on" is to be read as "at least in part based on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below.

In some examples, values, procedures, or apparatus are referred to as "best," "lowest," "highest," "minimum," "maximum," or the like. It will be appreciated that such descriptions are intended to indicate that a selection among many used functional alternatives can be made, and such selections need not be better, smaller, higher, or otherwise preferable to other selections.

As described above, in NR, beam management generally includes the following four different procedures: beam sweeping, beam measurement, beam determination and beam reporting. In beam sweeping procedure, a spatial area can be covered with a set of beams transmitted and received according to pre-specified intervals and directions. In beam measurement procedure, the quality of received reference signals may be evaluated at a network device (such as, a gNB) or at a terminal device (such as, a UE) according to pre-specified metrics (such as, Reference Signal Received Power, RSRP). In beam determination procedure, suitable beam(s) may be selected either at the network device or at the terminal device, according to the measurements obtained with the beam measurement procedure. The terminal device can use the beam reporting procedure to send beam quality and beam decision information to a Radio Access Network (RAN). There procedures are periodically repeated to update the optimal transmitter and receiver beam pair over time.

In 3GPP specifications, it has been agreed that L1-RSRP reporting for beam management can be based on the following reference signals: synchronization signal blocks (SSBs), Channel State Information-Reference Signals (CSI-RSs) or a combination thereof. For SSB based beam management, the current specifications only support single-TRP/panel beam reporting. However, in multi-TRP transmission, suitable beam(s) may be selected from different TRPs, while the current specifications do not support multi-TRP/panel beam reporting.

FIG. 1 illustrates an example communication network 100 in which multi-TRP transmission can be supported. As shown in FIG. 1, the network 100 includes a gNB 110, which is coupled with two TRPs 120-1 and 120-2 (collectively referred to as TRPs 120 or individually referred to as TRP 120). The network 100 also includes a UE 130 served by the gNB 110. Each of the TRPs 120 may include a plurality of beams. For example, as shown in FIG. 1, the TRP 120-1 may include four beams 121-1, 121-2, 121-3, and 121-4, while the TRP 120-2 may also include four beams 122-1, 122-2, 122-3 and 122-4.

In the network 100 as shown in FIG. 1, suppose that L1-RSRP reporting for beam management is based on SSBs only. As used herein, a "SSB" refers to a transmission unit composed of a primary synchronization signal (PSS), a secondary synchronization signal (SSS) and associated Physical Broadcast Channel (PBCH) signals. For example, one SS block may contain K Orthogonal Frequency Division Multiplexing (OFDM) symbols (K is an integer and K≥4), in which one symbol is used for PSS (also referred to as "PSS symbol"), one symbol is used for SSS (also referred to as "SSS symbol") and the remaining K−2 symbols are used for PBCH (also referred to as "PBCH symbols"). A SSB burst set may include a number of SSBs, and the SSB burst set may be repeated with a certain periodicity. For example, the periodicity may be one of {5 ms, 10 ms, 20 ms, 40 ms, 80 ms, 160 ms}. Index information associated with the SSBs may be predefined or configured to the UE 130, so as to facilitate the detection of the SSBs by the UE 130.

The transmission of SSBs within the SS burst set may be confined to a 5 ms window, regardless of the periodicity of the SS block burst set. For different frequency ranges, the maximum number of SSBs within the SSB burst set, L, may be different. For example, for frequency range up to 3 GHz, L can be 4; for frequency range from 3 GHz to 6 GHz, L can be 8; and for frequency range from 6 GHz to 52.6 GHz, L can be 64.

In the example as shown in FIG. 1, suppose that the maximum number of SSBs within the SSB burst set is 4, and 4 SSBs can be transmitted using different beams from the TRP 120. Suppose that the cell identities of the TRPs 120-1 and 120-2 are the same. In this case, for example, the SSB indices associated with the beams 121 may be the same as those associated with the beams 122, respectively. That is, the SSB index associated with the beam 121-1 may be the same as that associated with the beam 122-1; the SSB index associated with the beam 121-2 may be the same as that associated with the beam 122-2; the SSB index associated with the beam 121-3 may be the same as that associated with the beam 122-3; and the SSB index associated with the beam 121-4 may be the same as that associated with the beam 122-4. If the UE 130 detects that the best beam from the TRP 120-1 is the beam 121-2 and the best beam from the TRP 120-2 is the beam 122-3 (for example, in beam determination procedure as described above) and reports the SSB indices associated with the beams 121-2 and 122-3 to the gNB 110 (for example, in beam reporting procedure as described above), the gNB 110 may not know which TRP each of the two beams 121-2 and 122-3 comes from.

Embodiments of the present disclosure provide a solution for beam management, so as to solve the problems above and one or more of other potential problems. With the solution, beam reporting for multi-TRP/panel transmission can be supported. Principle and implementations of the present disclosure will be described in detail below with reference to FIGS. 2-14.

Figure 2:
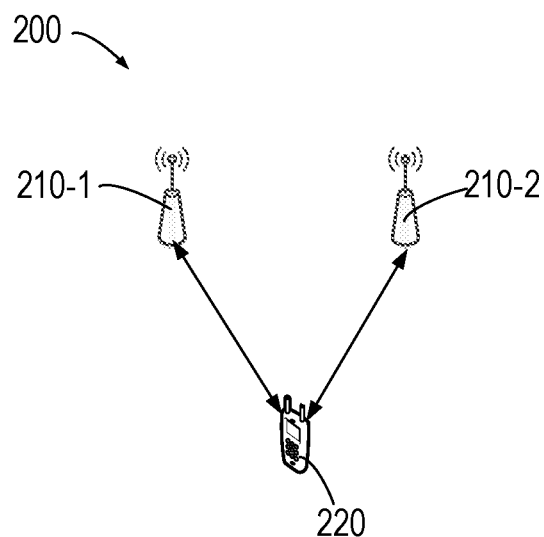
FIG. 2 shows an example communication network in which embodiments of the present disclosure can be implemented.

FIG. 2 shows an example communication network 200 in which embodiments of the present disclosure can be implemented. The network 200 includes two network device 210-1 and 210-2 (collectively referred to as network devices 210 or individually referred to as network device 210) and one terminal device 220 served by the network devices 210. It is to be understood that the number of network devices and terminal devices is only for the purpose of illustration without suggesting any limitations. The network 200 may include any suitable number of network devices and the terminal devices adapted for implementing embodiments of the present disclosure.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, image capture devices such as digital cameras, gaming devices, music storage and playback appliances, or Internet appliances enabling wireless or wired Internet access and browsing and the like. For the purpose of discussion, in the following, some embodiments will be described with reference to UE as an example of the terminal device 220.

As used herein, the term "network device" or "base station" (BS) refers to a device which is capable of providing or hosting a cell or coverage where terminal devices can communicate. Examples of a network device include, but not limited to, a Node B (NodeB or NB), an Evolved NodeB (eNodeB or eNB), a next generation NodeB (gNB), a Transmission Reception Point (TRP), a Remote Radio Unit (RRU), a radio head (RH), a remote radio head (RRH), a low power node such as a femto node, a pico node, and the like.

In some embodiments, for example, the network devices 210-1 and 210-2 are two TRPs coupled to a same gNB. For example, the network device 210-1 may be the TRP 120-2 and the network device 210-2 may be the TRP 120-1, as shown in FIG. 1. Alternatively, in some other embodiments, the network devices 210-1 and 210-2 may be two separate gNBs in communication with each other. Only for the purpose of discussion without suggesting any limitations to the scope of the present disclosure, in the following, some embodiments will be described with reference to TRPs as examples of the network devices 210.

In the following discussion, only for ease of description, the network device 210-1 may also be referred to as "first network device" and the network device 210-2 may also be referred to as "second network device". The coverage of the first network device 210-1 (not shown in FIG. 2) may be referred to as a "first cell", and the coverage of the second network device 210-2 (not shown in FIG. 2) may be referred to as a "second cell". For example, the first cell may be the same as or different from the second cell.

The network devices 210 may communicate with the terminal device 220. The communications in the network 200 may conform to any suitable standards including, but not limited to, Long Term Evolution (LTE), LTE-Evolution, LTE-Advanced (LTE-A), Wideband Code Division Multiple Access (WCDMA), Code Division Multiple Access (CDMA) and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

Figure 3:
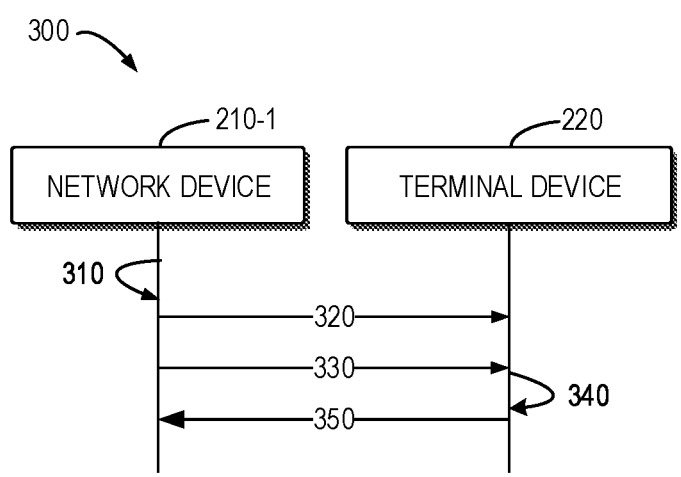
FIG. 3 shows an example process for multi-TRP beam management according to some embodiments of the present disclosure.

In some embodiments, for example, during an initial access procedure, the terminal device 220 may access to the second network device 210-2 and a set of resources for transmitting synchronization and/or reference signals may be configured by the second network device 210-2 to the terminal device 220. After initial access, the first network device 210-1 may configure some additional resources for multi-TRP beam management. FIG. 3 shows an example process 300 for multi-TRP beam management according to some embodiments of the present disclosure. For the purpose of discussion, the process 300 will be described with reference to FIG. 2. The process 300 may involve the terminal device 220 and one or more network devices 210 serving the terminal device 220.

As shown in FIG. 2, the first network device 210-1 determines (310) a first group of resources to be used by the terminal device 210 for determining a first group of beams from the first network device 210-1. In some embodiments, the first group of resources may be different from a second group of resources configured by the second network device 210-2 to the terminal device 220. The first network device 210-1 then configures (320) the first group of resources to the terminal device 220.

In some embodiments, the first and second group of resources may be SSB resources. As used herein, a "SSB resource" refers to one or more resource elements in time, frequency, and/or code domain allocated for transmission of SSBs. In some other embodiments, the first and second group of resources may be CSI-RS resources. As used herein, a "CSI-RS resource" refers to one or more resource elements in time, frequency, and/or code domain allocated for transmission of CSI-RS. Only for the purpose of illustration, in the following, some embodiments will be described with SSB resources as examples of the first or second group of resources. For example, the first group of resources may also be referred to as a "first group of SSB resources", and the second group of resources may also be referred to as a "second group of SSB resources". However, it is to be understood that embodiments of the present disclosure are also applicable to resources for transmitting reference signals (such as, CSI-RS), and the present disclosure will not be limited in this aspect.

In some embodiments, the first and second groups of SSB resources may be associated with different resource allocation in time, frequency and/or code domain. For example, in some embodiments, the first and second groups of SSB resources may be associated with different periodicities and/or offsets in time domain. Alternatively, or in addition, in some embodiments, the first and second groups of SSB resources may be associated with different cell identities. Alternatively, or in addition, in some embodiments, the first and second groups of SSB resources may be associated with different locations and/or offsets in frequency domain.

In some embodiments, the first groups of SSB resources may include M SSB resources, while the second groups of SSB resources may include N SSB resources, where M and N are both integers and M may be same as or different from N. In this case, the terminal device 220 can measure RSRPs and/or beams based on M+N SSB resources.

In some embodiments, the first and second groups of SSB resources may be included in a same SSB resource set. Alternatively, in some other embodiments, the first and second groups of SSB resources may be included in different SSB resource sets or different subsets of a SSB resource set.

In some embodiments, for different sets or subsets of SSB resources, the cell identities (IDs) for generating SSB sequences may be different. That is, the first and second groups of SSB resources may be associated with different IDs for generating SSB sequences. For example, the ID may be used to generate the sequence for PSS and/or SSS to be transmitted on the SSB resource. As another example, the ID may be used to generate the sequence for Demodulation Reference Signal (DMRS) of PBCH and/or scrambling sequence for PBCH to be transmitted on the SSB resource. In some embodiments, the first groups of SSB resources may include M SSB resources, while the second groups of SSB resources may include N SSB resources, where M and N are both integers and M may be same as or different from N. For example, for the first cell or the first network device 210-1 (such as, TRP or panel), the ID for generating SSB sequences may be represented as ID1. For the second cell or the second network device 210-2, the ID for generating SSB sequences may be represented as ID2. For example, ID1 may be different from ID2. Additionally, in some embodiments, resource allocation in time, frequency and/or code domain for the first group of SSB resources may be same as that for the second group of SSB resources. In this case, indices of the SSB resources for different network devices can be distinguished implicitly. For example, the indices for the first groups of SSB resources may be interpreted as 0, 1, 2 . . . M−1, while the indices for the second group of SSB resources may be interpreted as M, M+1 . . . N+M−1.

Figure 4:
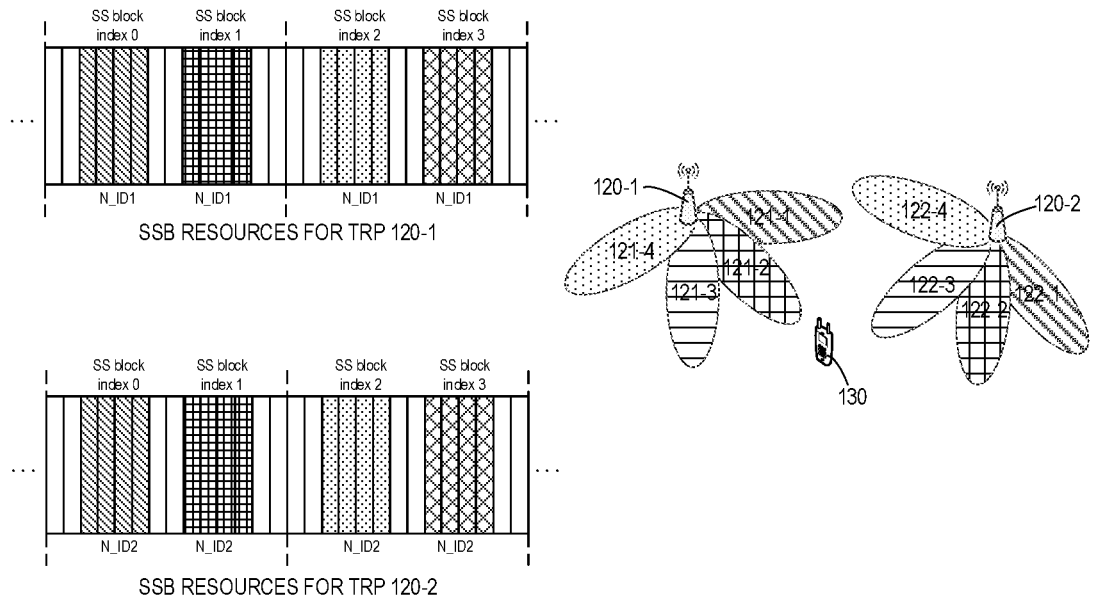
FIG. 4 shows an example of some embodiments of the present disclosure.

FIG. 4 shows an example of such embodiments. Specifically, for example, FIG. 4 shows the TRPs 120 and the UE 130 as shown in FIG. 1. In the example as shown in FIG. 4, suppose that the maximum number of SSBs within the SSB burst set is 4, and the indices for the 4 SSBs are 0, 1, 2 and 3 originally. As shown in FIG. 4, SSB resources for the TRP 120-1 and SSB resources for the TRP 120-2 share the same resource allocation pattern in time, frequency and/or code domain. However, for the TRP 120-1, the ID for generating SSB sequences may be N_ID1; while for the TRP 120-2, the ID for generating SSB sequences may be N_ID2, where N_ID1 is different from N_ID2. For initial access, the UE 130 may access to the TRP 120-1 and obtain the cell ID N_ID1. For N_ID1, the indices for the 4 SSBs may be interpreted as 0, 1, 2 and 3 by both of the gNB 110 and the UE 130. After initial access, another cell ID N_ID2 may be configured by the TRP 120-2 to the UE 130. For N_ID2, the indices for the 4 SSBs may be interpreted as 4, 5, 6 and 7 by both of the gNB 110 and the UE 130, rather than the original indices 0, 1, 2 and 3.

In some embodiments, the terminal device 220 may be configured with two sets/subsets of SSB resources. For the first set/subset of SSB resources, a first ID may be used for sequence generation. For the second set/subset of SSB resources, a second ID may be used for sequence generation. In some embodiments, the first ID for sequence generation may be same as the cell ID of the serving cell. For example, the first ID for sequence generation may be obtained from the initial access procedure. In some embodiments, the terminal device 220 may be configured with a second ID for generating SSB sequences for the second set/subset of SSB resources. In some embodiments, the value of the second ID may be different from the value of the first ID.

In some embodiments, for different sets or subsets of SSB resources, the resource allocation in time domain may be different. For example, the first and second groups of SSB resources may be associated with different periodicities and/or offsets in time domain. In some embodiments, the first groups of SSB resources may include M SSB resources, while the second groups of SSB resources may include N SSB resources, where M and N are both integers and M may be same as or different from N. For example, for the first cell or the first network device 210-1 (such as, TRP or panel), the offset in time domain may be represented as T_O1. For the second cell or the second network device 210-2, the offset in time domain may be represented as T_O2, which may be different from T_O1. As another example, for the first group of SSB resources, there may be no offset in time domain, or alternatively, the offset in time domain may be represented as 0. For the second group of SSB resources, the offset in time domain may be represented as T_O2, where the offset in time domain is the time interval between the first group of SSB resources and the second group of SSB resources.

In some embodiments, the terminal device 220 may be configured with two sets or subsets of SSB resources, and the terminal device 220 may be configured with an offset value only for the second set or subset of SSB resources, where the offset value indicates the time offset between the first set or subset of SSB resources and the second set or subset of SSB resources.

In some embodiments, the offset in time domain may refer to a time offset in a SS burst set within the 5 ms window. In some embodiments, the offset in time domain may refer to a time offset for the whole SS burst set. For example, the offset may be a multiple of 5 ms. In some embodiments, the available offset may be based on the periodicity of the SS burst set in the first and/or second group of SSB resources. For example, if the periodicity is 5 ms, there may be no available offset values. As another example, if the periodicity is 10 ms, the available offset value may be 5 ms. As another example, if the periodicity is 20 ms, the available offset value may be any of {5 ms, 10 ms, 15 ms}. As another example, if the periodicity is 40 ms, the available offset value may be any of {5 ms, 10 ms, 15 ms, 20 ms, 25 ms, 30 ms, 35 ms}. As another example, if the periodicity is 80 ms, the available offset value may be any of X*5 ms, where X∈{1, 2, 3, . . . 14, 15}. As another example, if the periodicity is 160 ms, the available offset value may be any of X*5 ms, where X∈{1, 2, 3, . . . 30, 31}. In this case, indices of the SSB resources for different network devices can be distinguished implicitly. For example, the indices for the first groups of SSB resources may be interpreted as 0, 1, 2 . . . M−1, while the indices for the second group of SSB resources may be interpreted as M, M+1 . . . N+M−1.

Figure 5:
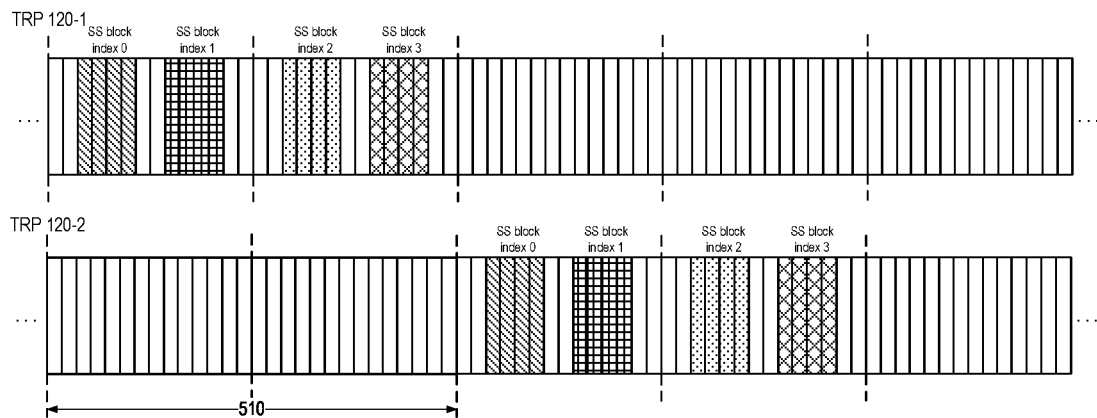
FIG. 5 shows an example of some embodiments of the present disclosure.

FIG. 5 shows an example of such embodiments. Specifically, for example, FIG. 5 shows SSB resources for the TRP 120-1 and SSB resources for the TRP 120-2. In the example as shown in FIG. 5, suppose that the maximum number of SSBs within the SSB burst set is 4, and the indices for the 4 SSBs are 0, 1, 2 and 3 originally. As shown in FIG. 5, the SSB resources for the TRP 120-1 and the SSB resources for the TRP 120-2 are associated with different offsets in time domain. For example, for the TRP 120-1, the time offset for SSB resources may be T_O1; while for the TRP 120-2, the time offset for SSB resources may be T_O2, which is different from T_O1. As shown in FIG. 5, the difference between the time offsets T_O1 and T_O2 is represented as 510.

For initial access, the UE 130 may access to the TRP 120-1 and obtain the time offset T_O1. The UE 130 can determine the locations of the SSB resources associated with the TRP 120-1 based on the time offset T_O1. For the time offset T_O1, the indices for the 4 SSBs may be interpreted as 0, 1, 2 and 3 by both of the gNB 110 and the UE 130. After initial access, another time offset T_O2 may be configured by the TRP 120-2 to the UE 130. The UE 130 can determine the locations of the SSB resources associated with the TRP 120-2 based on the time offset T_O2. For the time offset T_O2, the indices for the 4 SSBs may be interpreted as 4, 5, 6 and 7 by both of the gNB 110 and the UE 130, rather than the original indices 0, 1, 2 and 3.

In some embodiments, for example, there may be no time offset for SSB resources for the TRP 120-1, or alternatively, the time offset T_O1 may be 0; while for the TRP 120-2, the time offset for SSB resources may be T_O2, which indicates the interval between the first group of SSB resources and the second group of SSB resources.

For initial access, the UE 130 may access to the TRP 120-1 and obtain the time locations of SSB resources associated with the TRP 120-1. For the SSB resources associated with the TRP 120-1, the indices for the 4 SSBs may be interpreted as 0, 1, 2 and 3 by both of the gNB 110 and the UE 130. After initial access, a time offset T_O2 may be configured to the UE 130. The UE 130 can determine the locations of SSB resources associated with the TRP 120-2 based on the time offset T_O2. For the SSB resources associated with the TRP 120-2, the indices for the 4 SSBs may be interpreted as 4, 5, 6 and 7 by both of the gNB 110 and the UE 130, rather than the original indices 0, 1, 2 and 3.

In some embodiments, for different sets or subsets of SSB resources, the resource allocation in frequency domain may be different. For example, the first and second groups of SSB resources may be associated with different offsets in frequency domain. In some embodiments, the first groups of SSB resources may include M SSB resources, while the second groups of SSB resources may include N SSB resources, where M and N are both integers and M may be same as or different from N. For example, for the first cell or the first network device 210-1 (such as, TRP or panel), locations of the first group of SSB resources in frequency domain may be represented as F1. For the second cell or the second network device 210-2, locations of the second group of SSB resources in frequency domain may be represented as F2, which may be different from F1. For example, there may be an offset between the locations of the second group of SSB resources and the locations of the first group of SSB resources. For example, the frequency offset between the second group of SSB resources and the first group of SSB resources may be represented as a number of physical resource blocks (PRBs). As another example, the frequency offset between the second group of SSB resources and the first group of SSB resources may be represented as a number of resource elements (REs).

In some embodiments, the terminal device 220 may be configured with two sets or subsets of SSB resources, and the terminal device 220 may be configured with an offset value only for the second set or subset of SSB resources, where the offset value indicates the frequency offset between the first set or subset of SSB resources and the second set or subset of SSB resources. In some embodiments, the terminal device 220 may be configured with two sets or subsets of SSB resources, and the terminal device 220 may be configured with a frequency domain location only for the second set or subset of SSB resources, where the frequency domain location may indicate a common resource block (RB) index relative to the common RB #0 or a common resource element (RE) index relative to the RE #0 in the common RB #0.

As such, indices of the SSB resources for different network devices can be distinguished implicitly. For example, the indices for the first groups of SSB resources may be interpreted as 0, 1, 2 . . . M−1, while the indices for the second group of SSB resources may be interpreted as M, M+1 . . . N+M−1.

Figures 6, 7:
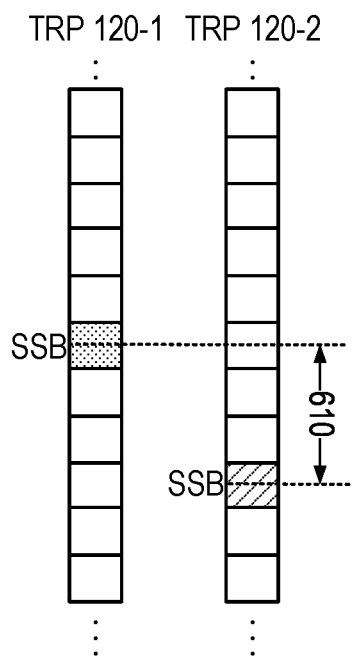
FIG. 6 shows an example of some embodiments of the present disclosure.
FIG. 7 shows an example beam report according to some embodiments of the present disclosure.

FIG. 6 shows an example of such embodiments. Specifically, for example, FIG. 6 shows SSB resources for the TRP 120-1 and SSB resources for the TRP 120-2. In the example as shown in FIG. 6, suppose that the maximum number of SSBs within the SSB burst set is 4, and the indices for the 4 SSBs are 0, 1, 2 and 3 originally. As shown in FIG. 6, the SSB resources for the TRP 120-1 and the SSB resources for the TRP 120-2 are associated with different offsets in frequency domain. For example, for the TRP 120-1, the frequency offset for SSB resources may be F_O1; while for the TRP 120-2, the time offset for SSB resources may be F_O2, which is different from F_O1. As shown in FIG. 6, the difference between the frequency offsets F_O1 and F_O2 is represented as 610.

For initial access, the UE 130 may access to the TRP 120-1 and obtain the frequency offset F_O1. The UE 130 can determine the locations of the SSB resources associated with the TRP 120-1 based on the frequency offset F_O1. For the frequency offset F_O1, the indices for the 4 SSBs may be interpreted as 0, 1, 2 and 3 by both of the gNB 110 and the UE 130. After initial access, another frequency offset F_O2 may be configured by the TRP 120-2 to the UE 130. The UE 130 can determine the locations of the SSB resources associated with the TRP 120-2 based on the frequency offset F_O2. For the frequency offset F_O2, the indices for the 4 SSBs may be interpreted as 4, 5, 6 and 7 by both of the gNB 110 and the UE 130, rather than the original indices 0, 1, 2 and 3.

With reference back to FIG. 2, the first network device 210-1 then transmits (330), using the first group of beams, a plurality of synchronization and/or reference signals (such as SSBs and/or CSI-RS) on the first group of resources to the terminal device 220. At the terminal device 220, in response to being configured with the first group of resources for determining the first group of beams from the first network device 210-1, the terminal device 220 determines (340) a first group of RSRPs associated with the first group of beams by detecting the plurality of synchronization and/or reference signals transmitted on the first group of resources. The terminal device 220 then indicates (350) a result of the determination to the first network device 210-1.

In some embodiments, for multi-TRP beam management, a plurality of SSB/CSI-RS resources may be configured to the terminal device 220. For example, as described above, the first group of SSB/CSI-RS resources may be configured for transmission of SSBs/CSI-RS from the first network device 210-1 to the terminal device 220. The second group of SSB/CSI-RS resources may be configured for transmission of SSBs/CSI-RS from the second network device 210-2 to the terminal device 220. In some embodiments, the first and second groups of SSB/CSI-RS resources may be included in a same SSB/CSI-RS resource set. Alternatively, in some other embodiments, the first and second groups of SSB/CSI-RS resources may be included in different SSB/CSI-RS resource sets or different subsets of a SSB/CSI-RS resource set.

In some embodiments, the terminal device 220 may determine a first group of RSRPs associated with the first group of beams from the first network device 210-1 by detecting the plurality of SSBs/CSI-RS transmitted on the first group of SSB/CSI-RS resources. Additionally, the terminal device 220 may further determine a second group of RSRPs associated with the second group of beams from the second network device 210-2 by detecting a plurality of SSBs/CSI-RS transmitted on the second group of SSB/CSI-RS resources.

In some embodiments, the terminal device 220 may be configured with two sets/subsets of SSB/CSI-RS resources. The first set/subset of SSB/CSI-RS resources may include M SSB/CSI-RS resources, while the second set/subset of SSB/CSI-RS resources may include N SSB/CSI-RS resources, where M and N are both integers and M may be same as or different from N.

In some embodiments, the terminal device 220 may be configured with two sets/subsets of SSB resources. The first set/subset of SSB resources may include M SSB resources, while the second set/subset of SSB resources may include N SSB resources, where M and N are both integers and M may be same as or different from N. In some embodiments, the number of bits for reporting SS/PBCH Block Resource Indicator (SSBRI) may be $\text{ceil}(\log_2(M+N))$.

In some embodiments, the terminal device 220 may be configured with two sets/subsets of CSI-RS resources. The first set/subset of CSI-RS resources may include M CSI-RS resources, while the second set/subset of CSI-RS resources may include N CSI-RS resources, where M and N are both integers and M may be same as or different from N. In some embodiments, the number of bits for reporting CSI-RS Resource Indicator (CRI) may be $\text{ceil}(\log_2(M+N))$ bits.

In some embodiments, the terminal device 220 may be configured to report a certain number of RSRPs as well as their associated SSB/CSI-RS resource indices (for example, SSBRI or CRI) to the network device for beam management. For example, the number can be represented as X. In some embodiments, the X SSB/CSI-RS resources (corresponding to the X RSRPs) to be reported may come from different sets of SSB/CSI-RS resources. For example, X1 resources out of the X SSB/CSI-RS resources may come from the first group of SSB/CSI-RS resources, while X2 resources out of the X SSB/CSI-RS resources may come from the second group of SSB/CSI-RS resources, where X1+X2=X. The first and second groups of SSB/CSI-RS resources may be included in two different SSB/CSI-RS resource sets. The terminal device 220 may need to report X1 RSRPs from the first group of RSRPs as well as respective indices of the X1 resources from the first group of SSB/CSI-RS resources to the network device. In addition, the terminal device 220 may also report X2 RSRPs from the second group of RSRPs as well as respective indices of the X2 resources from the second group of SSB/CSI-RS resources to the network device.

In some embodiments, an absolute value of RSRP may be reported by the terminal device 220 for a SSB/CSI-RS resource associated with the maximum RSRP among the first and second groups of RSRPs. For the rest of SSB/CSI-RS resources among the first and second groups of SSB/CSI-RS resources, differential values of RSRPs relative to the maximum RSRP may be reported by the terminal device 220. In addition, one additional bit may be used to indicate whether the maximum RSRP is from the first group of RSRPs or the second group of RSRPs. In this way, the overhead for beam reporting can be reduced. For example, the number of bits for reporting the absolute value of RSRP may be 7, and the number of bits for reporting each of the differential values of RSRPs may be 4. As another example, the number of bits for SS/PBCH block or CSI-RS resource indicator (SSBRI/CRI) may be $\text{ceil}(\log_2 M)$ if the SSB/CSI-RS resource is from the first groups of SSB/CSI-RS resources, and the number of bits for SS/PBCH block or CSI-RS resource indicator (SSBRI/CRI) may be $\text{ceil}(\log_2 N)$ if the SSB/CSI-RS resource is from the second groups of SSB/CSI-RS resources.

FIG. 7 shows an example beam report 700 according to some embodiments of the present disclosure. As shown in FIG. 7, a field 710 may be used to indicate whether the maximum RSRP is from the first group of RSRPs or the second group of RSRPs. The size of the field 710 may be 1 bit. For example, if the value of the field 710 is '0', it may indicate that the maximum RSRP is from the first group of RSRPs; while if the value of the field 710 is '1', it may indicate that the maximum RSRP is from the second group of RSRPs. In the example as shown in FIG. 7, suppose that the value of the field 710 is '0'. That is, the maximum RSRP is from the first group of RSRPs. Fields 720-1~720-X1 may be used to indicate respective indices of the X1 resources from the first group of SSB/CSI-RS resources to be reported, each of which may have a size of $\text{ceil}(\log_2 M)$ bits. Fields 730-1~730-X2 may be used to indicate respective indices of the X2 resources from the second group of SSB/CSI-RS resources to be reported, each of which may have a size of $\text{ceil}(\log_2 N)$ bits. Fields 740-1~740-X1 may be used to indicate X1 RSRPs from the first group of RSRPs to be reported, and fields 750-1~750-X2 may be used to indicate X2 RSRPs from the second group of RSRPs to be reported. For example, the field 740-1 may be used to indicate an absolute value of the maximum RSRP, which may have a size of 7 bits. The fields 740-2~740-X1 and 750-1~750-X2 may be used to indicate differential values of RSRPs relative to the maximum RSRP, each of which may have a size of 4 bits.

Alternatively, in some embodiments, an absolute value of RSRP may be reported by the terminal device 220 for a SSB/CSI-RS resource associated with a first RSRP from the first group of RSRPs, where the first RSRP may be the maximum one among the first group of RSRPs. For the rest of SSB/CSI-RS resources among the first and second groups of SSB/CSI-RS resources, differential values of RSRPs may be reported by the terminal device 220. For example, the terminal device 220 may indicate a differential value of a second RSRP from the second group of RSRPs relative to the first RSRP, where the second RSRP may be the maximum one among the second group of RSRPs. The terminal device 220 may also indicate a differential value of a third RSRP from the first group of RSRPs relative to the first RSRP and a differential value of a fourth RSRP from the second group of RSRPs relative to the first or second RSRP. Since the maximum RSRP among the second group of RSRPs (that is, the second RSRSP) may greater or less than the first RSRP, the differential value of the second RSRP may be negative or positive. In some embodiments, at least for the second RSRP from the second group of RSRPs, the number of bits used to indicate the differential value for the second RSRP may be different from other differential values. In this way, the overhead for beam reporting can be reduced.

FIG. 8 shows an example beam report 800 according to some embodiments of the present disclosure. As shown in FIG. 8, Fields 810-1~810-X1 may be used to indicate respective indices of the X1 resources from the first group of SSB/CSI-RS resources to be reported, each of which may have a size of ceil($\log_2 M$) bits. Fields 820-1~820-X2 may be used to indicate respective indices of the X2 resources from the second group of SSB/CSI-RS resources to be reported, each of which may have a size of ceil($\log_2 N$) bits. Fields 830-1~830-X1 may be used to indicate X1 RSRPs from the first group of RSRPs to be reported, and fields 840-1~840-X2 may be used to indicate X2 RSRPs from the second group of RSRPs to be reported. For example, the field 830-1 may be used to indicate an absolute value of the maximum RSRP among the first group of RSRPs (that is, the first RSRP), which may have a size of 7 bits. The field 840-1 may be used to indicate a differential value of the maximum RSRP among the second group of RSRPs (that is, the second RSRP) relative to the first RSRP, which may have a size of P bits. For example, P>4 and P≤7. That is, P can be 5, 6 or 7. The fields 830-2~830-X1 may be used to indicate differential values of RSRPs from the first group of RSRPs relative to the first RSRP, each of which may have a size of 4 bits. The fields 840-2~840-X2 may be used to indicate differential values of RSRPs relative to the first or second RSRP, each of which may have a size of 4 bits.

In some embodiments, the differential values of RSRPs from the second group of RSRPs relative to the first RSRP and the differential values of RSRPs from the first group of RSRPs relative to the first RSRP may be associated with different parameters. For example, such parameters may include at least one of the following: positive or negative of a differential value, a step size for determining the differential value and the maximum value among the differential values. In some embodiments, the step size for determining the differential values of RSRPs from the first group of RSRPs relative to the first RSRP may be 2 dB, while the step size for determining the differential values of RSRPs from the second group of RSRPs relative to the first RSRP may be Y dB, where Y>2. For example, Y may be 3, 4 or 5. In some embodiments, all of the differential values of RSRPs from the first group of RSRPs relative to the first RSRP may be non-negative or non-positive. However, the differential values of RSRPs from the second group of RSRPs relative to the first RSRP may include positive values, negative values and 0. In some embodiments, the maximum value among the differential values of RSRPs from the first group of RSRPs relative to the first RSRP may be Z1, while the maximum value among the differential values of RSRPs from the second group of RSRPs relative to the first RSRP may be Z2. In some embodiments, Z1 may be different from Z2. For example, Z1>Z2.

Alternatively, in some embodiments, an absolute value of RSRP may be reported by the terminal device 220 for a SSB/CSI-RS resource associated with a first RSRP from the first group of RSRPs, where the first RSRP may be the maximum one among the first group of RSRPs. For the rest of SSB/CSI-RS resources among the first and second groups of SSB/CSI-RS resources, differential values of RSRPs may be reported by the terminal device 220. For example, the terminal device 220 may indicate a differential value of a second RSRP from the second group of RSRPs relative to the first RSRP, where the second RSRP may be the maximum one among the second group of RSRPs. The terminal device 220 may also indicate a differential value of a third RSRP from the first group of RSRPs relative to the first RSRP and a differential value of a fourth RSRP from the second group of RSRPs relative to the first RSRP. Since the maximum RSRP among the second group of RSRPs (that is, the second RSRSP) may greater or less than the first RSRP, the differential value of the second RSRP may be negative or positive. In some embodiments, at least for the second RSRP from the second group of RSRPs, one additional bit may be used to indicate whether the first RSRP is greater than the second RSRP or not. In this way, the overhead for beam reporting can be reduced.

FIG. 9 shows an example beam report 900 according to some embodiments of the present disclosure. As shown in FIG. 9, Fields 910-1~910-X1 may be used to indicate respective indices of the X1 resources from the first group of SSB/CSI-RS resources to be reported, each of which may have a size of ceil($\log_2 M$) bits. Fields 920-1~920-X2 may be used to indicate respective indices of the X2 resources from the second group of SSB/CSI-RS resources to be reported, each of which may have a size of ceil($\log_2 N$) bits. Fields 930-1~930-X1 may be used to indicate X1 RSRPs from the first group of RSRPs to be reported, and fields 940-1~940-X2 may be used to indicate X2 RSRPs from the second group of RSRPs to be reported. In addition, a field 950 may be used to indicate whether the maximum RSRP among the first group of RSRPs is greater than the maximum RSRP among the second group of RSRPs or not. For example, the field 930-1 may be used to indicate an absolute value of the maximum RSRP among the first group of RSRPs (that is, the first RSRP), which may have a size of 7 bits. The field 940-1 may be used to indicate a differential value of the maximum RSRP among the second group of RSRPs (that is, the second RSRP) relative to the first RSRP, which may have a size of 4 bits. The fields 930-2~930-X1 and 840-2~840-X2 may be used to indicate differential values of RSRPs from the first and second groups of RSRPs relative to the first RSRP, each of which may have a size of 4 bits.

Alternatively, in some embodiments, an absolute value of RSRP may be reported by the terminal device 220 for a SSB/CSI-RS resource associated with a first RSRP from the first group of RSRPs, where the first RSRP may be the maximum one among the first group of RSRPs. An absolute value of RSRP may be reported by the terminal device 220 for a SSB/CSI-RS resource associated with a second RSRP from the second group of RSRPs, where the second RSRP may be the maximum one among the second group of RSRPs. For the rest of SSB/CSI-RS resources among the first group of SSB/CSI-RS resources, differential values of RSRPs relative to the first RSRP may be reported by the terminal device 220. For the rest of SSB/CSI-RS resources among the second group of SSB/CSI-RS resources, differential values of RSRPs relative to the second RSRP may be reported by the terminal device 220. In this way, the overhead for beam reporting can be reduced.

FIG. 10 shows an example beam report 1000 according to some embodiments of the present disclosure. As shown in FIG. 10, Fields 1010-1~1010-X1 may be used to indicate respective indices of the X1 resources from the first group of SSB/CSI-RS resources to be reported, each of which may have a size of ceil(log$_2$M) bits. Fields 1020-1~1020-X2 may be used to indicate respective indices of the X2 resources from the second group of SSB/CSI-RS resources to be reported, each of which may have a size of ceil(log$_2$N) bits. Fields 1030-1~1030-X1 may be used to indicate X1 RSRPs from the first group of RSRPs to be reported, and fields 1040-1~1040-X2 may be used to indicate X2 RSRPs from the second group of RSRPs to be reported. For example, the field 1030-1 may be used to indicate an absolute value of the maximum RSRP among the first group of RSRPs (that is, the first RSRP), which may have a size of 7 bits. The field 1040-1 may be used to indicate an absolute value of the maximum RSRP among the second group of RSRPs (that is, the second RSRP), which may have a size of 7 bits. The fields 1030-2~1030-X1 may be used to indicate differential values of RSRPs from the first group of RSRPs relative to the first RSRP, each of which may have a size of 4 bits. The fields 1040-2~1040-X2 may be used to indicate differential values of RSRPs from the second group of RSRPs relative to the second RSRP, each of which may have a size of 4 bits.

In some embodiments, the terminal device 220 may be configured to report a certain number of RSRPs as well as their associated SSB/CSI-RS resource indices to the network device for beam management. For example, the number can be represented as X. In some embodiments, the X SSB/CSI-RS resources (corresponding to the X RSRPs) to be reported may come from a same SSB/CSI-RS resource set. For example, X1 resources out of the X SSB/CSI-RS resources may come from the first group of SSB/CSI-RS resources, while X2 resources out of the X SSB/CSI-RS resources may come from the second group of SSB/CSI-RS resources, where X1+X2=X. The first and second groups of SSB/CSI-RS resources are different subsets of the same SSB/CSI-RS resource set. The terminal device 220 may need to report X1 RSRPs from the first group of RSRPs as well as respective indices of the X1 resources from the first group of SSB/CSI-RS resources to the network device. In addition, the terminal device 220 may also report X2 RSRPs from the second group of RSRPs as well as respective indices of the X2 resources from the second group of SSB/CSI-RS resources to the network device.

In some embodiments, an absolute value of RSRP may be reported by the terminal device 220 for a SSB/CSI-RS resource associated with the maximum RSRP among the first and second groups of RSRPs. For the rest of SSB/CSI-RS resources among the first and second groups of SSB/CSI-RS resources, differential values of RSRPs relative to the maximum RSRP may be reported by the terminal device 220.

FIG. 11 shows an example beam report 1100 according to some embodiments of the present disclosure. As shown in FIG. 11, fields 1110-1~1110-X may be used to indicate respective indices of the X resources from the first and second groups of SSB/CSI-RS resources to be reported, each of which may have a size of ceil(log$_2$(N+M)) bits. Fields 1120-1-1120-X may be used to indicate X RSRPs from the first and second groups of RSRPs to be reported. For example, the field 1120-1 may be used to indicate an absolute value of the maximum RSRP, which may have a size of 7 bits. The fields 1120-2~1120-X may be used to indicate differential values of RSRPs relative to the maximum RSRP, each of which may have a size of 4 bits.

In some embodiments, for multi-TRP beam management, a plurality of SSB and/or CSI-RS resources may be configured to the terminal device 220. For example, in the network as shown in FIG. 2, during the initial access procedure, the terminal device 220 may access to the second network device 210-2 and a set of SSB resources (also referred to as "initial access SSB resources") may be configured by the second network device 210-2 to the terminal device 220. After initial access, the first network device 210-1 may configure some additional SSB resources for multi-TRP beam management. In some embodiments, only a subset of the set of initial access SSB resources can be configured by the first network device 210-1 for multi-TRP beam management. For example, the set of initial access SSB resources may include R SSB resource in total. For example, Q SSB resources out of the R SSB resources can be configured for multi-TRP beam management, where Q≤R.

In some embodiments, for beam reporting, some combinations of beams from different network devices can be restricted from being reported. For example, in the example as shown in FIG. 1, a combination of the beam 121-1 from the TRP 120-1 and the beam 121-4 from the TRP 120-2 may be restricted from being reported. As such, the overhead for beam reporting can be further reduced.

Figure 12:
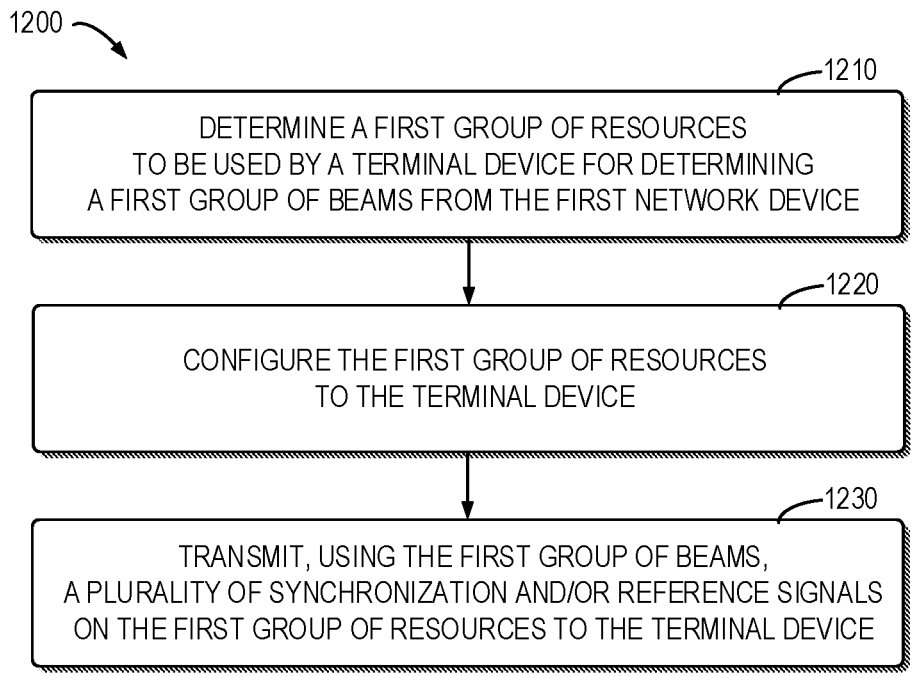
FIG. 12 shows a flowchart of an example method in accordance with some embodiments of the present disclosure.

FIG. 12 shows a flowchart of an example method 1200 in accordance with some embodiments of the present disclosure. The method 1200 can be implemented at the network device 210 (for example, the network device 210-1) as shown in FIG. 2. For the purpose of discussion, the method 1200 will be described from the perspective of the network device 210-1 with reference to FIG. 2.

At block 1210, the first network device (for example, the network device 210-1) determines a first group of resources to be used by a terminal device (for example, the terminal device 220) for determining a first group of beams from the first network device. In some embodiments, the first group of resources may be different from a second group of resources configured by a second network device (for example, the network device 210-2) to the terminal device for determining a second group of beams from the second network device.

In some embodiments, the first network device determines the first group of resources such that the first and second groups of resources are associated with different resource allocation in time, frequency and/or code domain.

In some embodiments, the first network device determines the first group of resources such that the first and second groups of resources are associated with different cell identities.

In some embodiments, the first network device determines the first group of resources such that the first and second groups of resources are associated with different offsets in time domain.

In some embodiments, the first network device determines the first group of resources such that the first and second groups of resources are associated with different offsets in frequency domain.

In some embodiments, the first and second groups of resources are SSB resources, and the first and second groups of resources are included in a same SSB resource set.

In some embodiments, the first and second groups of resources are SSB resources, and the first and second groups of resources are included in different SSB resource sets.

In some embodiments, the first network device is a first Transmission Reception Point (TRP) and the second network device is a second TRP, and the first and second TRPs are coupled to a same base station.

At block 1220, the first network device configures the first group of resources to the terminal device.

At block 1230, the first network device transmits, using the first group of beams, a plurality of synchronization and/or reference signals on the first group of resources to the terminal device.

Figure 13:
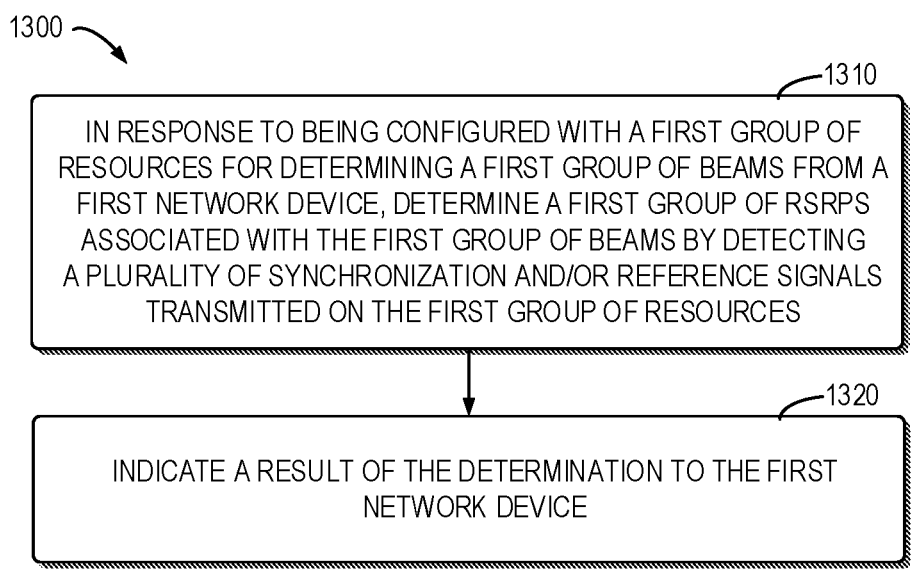
FIG. 13 shows a flowchart of an example method in accordance with some embodiments of the present disclosure.

FIG. 13 shows a flowchart of an example method 1300 in accordance with some embodiments of the present disclosure. The method 1300 can be implemented at the terminal device 220 as shown in FIG. 2. For the purpose of discussion, the method 1300 will be described from the perspective of the terminal device 220 with reference to FIG. 2.

At block 1310, in response to being configured with a first group of SSB/CSI-RS resources for determining a first group of beams from a first network device (for example, the network device 210-1), the terminal device determines a first group of Reference Signal Received Powers (RSRPs) associated with the first group of beams by detecting a plurality of synchronization and/or reference signals transmitted on the first group of resources. In some embodiments, the first group of resources may be different from a second group of resources configured by a second network device (for example, the network device 210-2) to the terminal device for determining a second group of beams from the second network device.

At block 1320, the terminal device indicates a result of the determination to the first network device.

In some embodiments, the first and second groups of resources are associated with different resource allocation in time, frequency and/or code domain.

In some embodiments, the first and second groups of resources are associated with different cell identities.

In some embodiments, the first and second groups of resources are associated with different offsets in time domain.

In some embodiments, the first and second groups of resources are associated with different offsets in frequency domain.

In some embodiments, the first and second groups of resources are SSB resources, and the first and second groups of resources are included in a same SSB resource set.

In some embodiments, the first and second groups of resources are SSB resources, and the first and second groups of resources are included in different SSB resource sets.

In some embodiments, the first network device is a first Transmission Reception Point (TRP) and the second network device is a second TRP, and the first and second TRPs are coupled to a same base station.

In some embodiments, the terminal device may further determine a second group of RSRPs associated with the second group of beams by detecting a plurality of synchronization and/or reference signals transmitted on the second group of resources.

In some embodiments, indicating the result of the determination to the first network device comprises: indicating, to the first network device, a first number of RSRPs from the first group of RSRPs and a second number of RSRPs from the second group of RSRPs.

In some embodiments, indicating the first number of RSRPs from the first group of RSRPs and the second number of RSRPs from the second group of RSRPs comprises: indicating an absolute value of the maximum RSRP among the first and second groups of RSRPs; indicating at least one differential value of at least one RSRP from the first and second groups of RSRPs relative to the maximum RSRP; and indicating whether the maximum RSRP is from the first group of RSRPs or the second group of RSRPs.

In some embodiments, indicating the first number of RSRPs from the first group of RSRPs and the second number of RSRPs from the second group of RSRPs comprises: indicating an absolute value of a first RSRP from the first group of RSRPs, the first RSRP being the maximum one among the first group of RSRPs; indicating a differential value of a second RSRP from the second group of RSRPs relative to the first RSRP, the second RSRP being the maximum one among the second group of RSRPs; indicating a differential value of a third RSRP from the first group of RSRPs relative to the first RSRP; and indicating a differential value of a fourth RSRP from the second group of RSRPs relative to the first or second RSRP.

In some embodiments, indicating the first number of RSRPs from the first group of RSRPs and the second number of RSRPs from the second group of RSRPs comprises: indicating an absolute value of a first RSRP from the first group of RSRPs, the first RSRP being the maximum one among the first group of RSRPs; indicating a differential value of a second RSRP from the second group of RSRPs relative to the first RSRP, the second RSRP being the maximum one among the second group of RSRPs; indicating a differential value of a third RSRP from the first group of RSRPs relative to the first RSRP; indicating a differential value of a fourth RSRP from the second group of RSRPs relative to the first RSRP; and indicating whether the first RSRP is greater than the second RSRP or not.

In some embodiments, indicating the first number of RSRPs from the first group of RSRPs and the second number of RSRPs from the second group of RSRPs comprises: indicating an absolute value of a first RSRP from the first group of RSRPs, the first RSRP being the maximum one among the first group of RSRPs; indicating an absolute value of a second RSRP from the second group of RSRPs, the second RSRP being the maximum one among the second group of RSRPs; indicating a differential value of a third RSRP from the first group of RSRPs relative to the first RSRP; and indicating a differential value of a fourth RSRP from the second group of RSRPs relative to the second RSRP.

It can be seen that, embodiments of the present disclosure provide a solution for beam management. With the solution, beam reporting for multi-TRP/panel transmission can be supported. Further, the overhead for beam reporting can be reduced.

Figure 14:
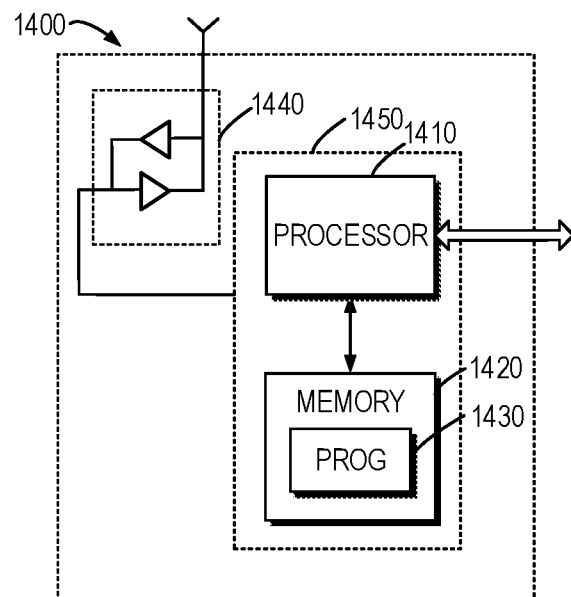
FIG. 14 is a simplified block diagram of a device that is suitable for implementing embodiments of the present disclosure.

FIG. 14 is a simplified block diagram of a device 1400 that is suitable for implementing embodiments of the present disclosure. The device 1400 can be considered as a further example implementation of the network device 210 or the terminal device 220 as shown in FIG. 2. Accordingly, the device 1400 can be implemented at or as at least a part of the network device 210 or the terminal device 220.

As shown, the device 1400 includes a processor 1410, a memory 1420 coupled to the processor 1410, a suitable transmitter (TX) and receiver (RX) 1440 coupled to the processor 1410, and a communication interface coupled to the TX/RX 1440. The memory 1410 stores at least a part of a program 1430. The TX/RX 1440 is for bidirectional communications. The TX/RX 1440 has at least one antenna to facilitate communication, though in practice an Access Node mentioned in this application may have several ones. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 1430 is assumed to include program instructions that, when executed by the associated processor 1410, enable the device 1400 to operate in accordance with the embodiments of the present disclosure, as discussed herein with reference to FIGS. 2 to 13. The embodiments herein may be implemented by computer software executable by the processor 1410 of the device 1400, or by hardware, or by a combination of software and hardware. The processor 1410 may be configured to implement various embodiments of the present disclosure. Furthermore, a combination of the processor 1410 and memory 1420 may form processing means 1450 adapted to implement various embodiments of the present disclosure.

The memory 1420 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 1420 is shown in the device 1400, there may be several physically distinct memory modules in the device 1400. The processor 1410 may be of any type suitable to the local technical network, and may include one or more of general purpose computers, special purpose computers, microprocessors, digital signal processors (DSPs) and processors based on multicore processor architecture, as non-limiting examples. The device 1400 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIGS. 12-13. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method implemented at a terminal device, comprising:
in response to being configured with a first synchronization signal block (SSB) resource set and a second SSB resource set, performing Reference Signal Received Power (RSRP) measurements based on SSB resources in the first SSB resource set and the second SSB resource set; and reporting a result of the measurement, wherein the result of the measurement comprises a first group of RSRPs corresponding to the first SSB resource set and a second group of RSRPs corresponding to the second SSB resource set, and a 1 bit indicator indicating whether a maximum RSRP is from the first group of RSRPs corresponding to the first SSB resource set or the second group of RSRPs corresponding to the second SSB resource set.

2. The method of claim 1, wherein reporting the result of the measurement further comprises:

indicating an absolute value of the maximum RSRP based on the 1 bit indicator; and indicating at least one differential value of the first group of RSRPs corresponding to the first SSB resource set and the second group of RSRPs corresponding to the second SSB resource set relative to the maximum RSRP.

3. The method of claim 2, wherein a number of bits for indicating the absolute value of the maximum RSRP is 7.

4. The method of claim 2, wherein a number of bits for indicating each differential value of RSRP is 4.

5. A method implemented at a network device comprising:

transmitting configuration information indicating a first synchronization signal block (SSB) resource set and a second SSB resource set; and receiving a report for a result of Reference Signal Received Power (RSRP) measurement based on SSB resources in the first SSB resource set and the second SSB resource set, wherein the report comprises a first group of RSRPs corresponding to the first SSB resource set and a second group of RSRPs corresponding to the second SSB resource set, and a 1 bit indicator indicating whether a maximum RSRP is from the first group of RSRPs corresponding to the first SSB resource set or the second group of RSRPs corresponding to the second SSB resource set.

6. The method of claim 5, wherein the report further comprises:

second information indicating an absolute value of the maximum RSRP based on the 1 bit indicator; and third information indicating at least one differential value of the first group of RSRPs corresponding to the first SSB resource set and the second group of RSRPs corresponding to the second SSB resource set relative to the maximum RSRP.

7. The method of claim 6, wherein a number of bits for indicating the absolute value of the maximum RSRP is 7.

8. The method of claim 6, wherein a number of bits for indicating each differential value of RSRP is 4.

9. A terminal device comprising:

a processor configured to cause the terminal device to:

in response to being configured with a first synchronization signal block (SSB) resource set and a second SSB resource set, perform Reference Signal Received Power (RSRP) measurements based on SSB resources in the first SSB resource set and the second SSB resource set; and report a result of the measurement, wherein the result of the measurement comprises a first group of RSRPs corresponding to the first SSB resource set and a second group of RSRPs corresponding to the second SSB resource set, and a 1 bit indicator indicating whether a maximum RSRP is from the first group of RSRPs corresponding to the first SSB resource set or the second group of RSRPs corresponding to the second SSB resource set.

10. The terminal device of claim 9, wherein the terminal device is caused to report the result of the measurement further by:

indicating an absolute value of the maximum RSRP based on the 1 bit indicator; and indicating at least one differential value of the first group of RSRPs corresponding to the first SSB resource set and the second group of RSRPs corresponding to the second SSB resource set relative to the maximum RSRP.

11. The terminal device of claim 10, wherein a number of bits for indicating the absolute value of the maximum RSRP is 7.

12. The terminal device of claim 10, wherein a number of bits for indicating each differential value of RSRP is 4.

13. A network device comprising:

a processor configured to cause the network device to:

transmit configuration information indicating a first synchronization signal block (SSB) resource set and a second SSB resource set; and receive a report for a result of Reference Signal Received Power (RSRP) measurement based on SSB resources in the first SSB resource set and the second SSB resource set, wherein the report comprises a first group of RSRPs corresponding to the first SSB resource set and a second group of RSRPs corresponding to the second SSB resource set, and a 1 bit indicator indicating whether a maximum RSRP is from the first group of RSRPs corresponding to the first SSB resource set or the second group of RSRPs corresponding to the second SSB resource set.

14. The network device of claim 13, wherein the report further comprises:

second information indicating an absolute value of the maximum RSRP based on the 1 bit indicator; and third information indicating at least one differential value of the first group of RSRPs corresponding to the first SSB resource set and the second group of RSRPs corresponding to the second SSB resource set relative to the maximum RSRP.

15. The network device of claim 14, wherein a number of bits for indicating the absolute value of the maximum RSRP is 7.

16. The network device of claim 14, wherein a number of bits for indicating each differential value of RSRP is 4.

17. A method implemented at a terminal device, comprising:

in response to being configured, in a same SSB resource set, with a first group of synchronization signal block (SSB) resources associated with a first cell identity and a second group of SSB resources associated with a second cell identity different from the first cell identity, performing Reference Signal Received Power (RSRP) measurement based on the first group of SSB resources and the second group of SSB resources; and reporting a result of the measurement, wherein the result of the measurement comprises at least one index of SSB resource to be reported, wherein the at least one index of the SSB resource to be reported is at least associated with the second cell identity.

18. A method implemented at a network device comprising:
- transmitting configuration information indicating, in a same SSB resource set, a first group of synchronization signal block (SSB) resources associated with a first cell identity and a second group of SSB resources associated with a second cell identity different from the first cell identity; and
- receiving a result of Reference Signal Received Power (RSRP) measurement based on the first group of SSB resources and the second group of SSB resources,
- wherein the result of the measurement comprises at least one index of SSB resource reported, wherein the at least one index of the SSB resource reported is at least associated with the second cell identity.

19. The terminal device of claim 2, wherein, based on the 1 bit indicator indicating the maximum RSRP being from the first group of RSRPs corresponding to the first SSB resource set, the result of the measurement comprises a mapping order as follows: indices of SSB resources in the first SSB resource set, indices of SSB resources in the second SSB resource set, RSRP value corresponding to the indices of SSB resources in the first SSB resource set, and RSRP value corresponding to the indices of SSB resources in the second SSB resource set.

20. The terminal device of claim 19, wherein the number of bits for indicating each index from the indices of the SSB resources in the first SSB resource set represents ceil($\log_2 M$), wherein M is number of the SSB resources in the first SSB resource set, and
- the number of bits for indicating each index from the indices of the SSB resources in the second SSB resource set represents ceil($\log_2 N$), wherein N is number of the SSB resources in the second SSB resource set.

21. The method of claim 6, wherein, based on the 1 bit indicator indicating the maximum RSRP being from the first group of RSRPs corresponding to the first SSB resource set, the result of the measurement comprises a mapping order as follows: indices of SSB resources in the first SSB resource set, indices of SSB resources in the second SSB resource set, RSRP value corresponding to the indices of SSB resources in the first SSB resource set, and RSRP value corresponding to the indices of SSB resources in the second SSB resource set.

22. The method of claim 21, wherein the number of bits for indicating each index from the indices of the SSB resources in the first SSB resource set represents ceil($\log_2 M$), wherein M is number of the SSB resources in the first SSB resource set, and
- the number of bits for indicating each index from the indices of the SSB resources in the second SSB resource set represents ceil($\log_2 N$), wherein N is number of the SSB resources in the second SSB resource set.

23. The terminal device of claim 10, wherein, based on the 1 bit indicator indicating the maximum RSRP being from the first group of RSRPs corresponding to the first SSB resource set, the result of the measurement comprises a mapping order as follows: indices of SSB resources in the first SSB resource set, indices of SSB resources in the second SSB resource set, RSRP value corresponding to the indices of SSB resources in the first SSB resource set, and RSRP value corresponding to the indices of SSB resources in the second SSB resource set.

24. The terminal device of claim 23, wherein the number of bits for indicating each index from the indices of the SSB resources in the first SSB resource set represents ceil($\log_2 M$), wherein M is number of the SSB resources in the first SSB resource set, and
- the number of bits for indicating each index from the indices of the SSB resources in the second SSB resource set represents ceil($\log_2 N$), wherein N is number of the SSB resources in the second SSB resource set.

25. The network device of claim 14, wherein, based on the 1 bit indicator indicating the maximum RSRP being from the first group of RSRPs corresponding to the first SSB resource set, the result of the measurement comprises a mapping order as follows: indices of SSB resources in the first SSB resource set, indices of SSB resources in the second SSB resource set, RSRP value corresponding to the indices of SSB resources in the first SSB resource set, and RSRP value corresponding to the indices of SSB resources in the second SSB resource set.

26. The network device of claim 25, wherein the number of bits for indicating each index from the indices of the SSB resources in the first SSB resource set represents ceil($\log_2 M$), wherein M is number of the SSB resources in the first SSB resource set, and
- the number of bits for indicating each index from the indices of the SSB resources in the second SSB resource set represents ceil($\log_2 N$), wherein N is number of the SSB resources in the second SSB resource set.

* * * * *